(12) United States Patent
Schütz

(10) Patent No.: US 7,712,639 B2
(45) Date of Patent: May 11, 2010

(54) PLASTIC OUTLET VALVE FOR TRANSPORT AND STORAGE CONTAINERS FOR LIQUIDS

(75) Inventor: Udo Schütz, Westerwald (DE)

(73) Assignee: Protechna S.A., Fribourg (CH)

( * ) Notice: Subject to any disclaimer, the term of this patent is extended or adjusted under 35 U.S.C. 154(b) by 1494 days.

(21) Appl. No.: 10/949,026

(22) Filed: Sep. 24, 2004

(65) Prior Publication Data

US 2005/0067602 A1 Mar. 31, 2005

(30) Foreign Application Priority Data

Sep. 27, 2003 (DE) ................................. 103 44 962

(51) Int. Cl.
*B65D 47/00* (2006.01)
(52) U.S. Cl. ................ 222/548; 137/15.22; 137/315.18; 251/305; 251/315.01
(58) Field of Classification Search ................ 222/556, 222/564, 548–549, 557; 251/304–305, 286–289, 251/149.2, 160, 315.01, 180, 306, 148; 137/15.22, 137/315.01, 315.02, 315.03, 315.18, 315.16
See application file for complete search history.

(56) References Cited

U.S. PATENT DOCUMENTS

| | | | | |
|---|---|---|---|---|
| 6,156,969 A | * | 12/2000 | Schutz | .................... 174/17 LF |
| 6,427,872 B1 | * | 8/2002 | Anderson | ..................... 222/83 |
| 6,883,682 B2 | * | 4/2005 | Anderson | ..................... 222/83 |
| 7,163,189 B2 | * | 1/2007 | Schutz | ........................ 251/148 |
| 7,490,621 B2 | * | 2/2009 | Schutz | .................... 137/15.18 |

FOREIGN PATENT DOCUMENTS

DE 195 11 723 C1 8/1996

* cited by examiner

*Primary Examiner*—Frederick C. Nicolas
(74) *Attorney, Agent, or Firm*—Friedrich Kueffner

(57) ABSTRACT

A plastic outlet valve for containers for liquids has a valve housing having an inlet socket and a union nut for securing the inlet socket on an outlet socket of a container. An anti-twist device in the form of an outer annular cam arrangement with locking cams is arranged on the inlet socket of the valve housing. The locking cams interlock with locking cams of an inner annular cam arrangement of the outlet socket of the container. As an alternative, an adapter ring with inner and outer locking cams is provided. The adapter ring is slipped onto the insertion end of the inlet socket of the valve housing. The inner locking cams engage matching external longitudinal grooves of the inlet socket of the valve housing, and the outer locking cams engage matching inner longitudinal grooves provided on the outlet socket of the container.

4 Claims, 4 Drawing Sheets

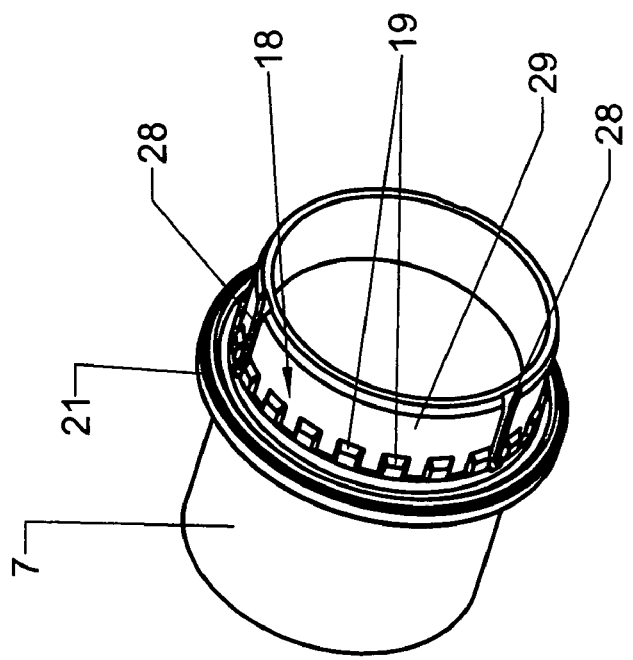
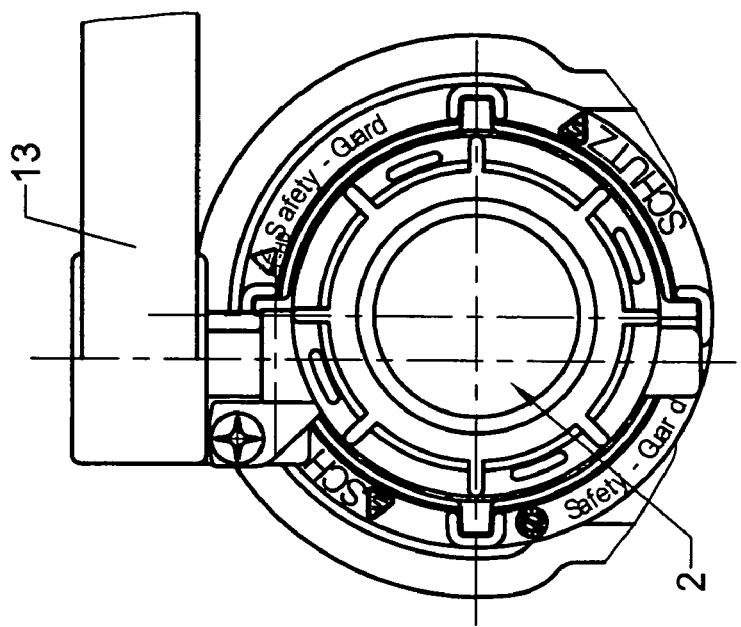

PLASTIC OUTLET VALVE FOR TRANSPORT AND STORAGE CONTAINERS FOR LIQUIDS

BACKGROUND OF THE INVENTION

1. Field of the Invention

The invention relates to an outlet valve made of plastic material, in particular, a butterfly valve or a ball valve, for plastic transport and storage containers for liquids. The outlet valve comprises a valve housing having an inlet socket that can be screwed by means of a union nut onto an outlet socket, provided with an outer thread, of the container for liquids, and further having an outlet socket (as described in German patent application DE 101 24 681 A1).

2. Description of the Related Art

Outlet valves of the aforementioned kind that are embodied as butterfly valves are used in connection with liquid containers, i.e., containers for transporting and storing liquids. Such containers are comprised of a pallet-shaped frame; an exchangeable inner container of plastic material having four sidewalls, a top wall and a bottom wall, a filling socket, and an outlet socket; as well as an outer jacket surrounding the inner container. The outer jacket is configured as a sheet metal jacket or a grate jacket comprised of horizontal and vertical metal bars.

When the outlet valve that is delivered by the manufacturer as a component of the container is mounted incorrectly by the customer on the outlet socket of the inner container of such a pallet container according to German patent DE 195 11 723 C1, there is the risk that the outlet valve is twisted such that the seal of the outlet valve is displaced or damaged; the outlet valve will leak as a result of this.

SUMMARY OF THE INVENTION

It is an object of the present invention to configure the outlet valve of the aforementioned kind with greatest possible safety against twisting in order to prevent damage of the seal of the outlet valve during mounting.

In accordance with the present invention, this is achieved in that the outlet valve has an anti-twist device comprising an outer annular cam arrangement that is arranged on the inlet socket of the valve housing, wherein the locking cams of the cam arrangement upon tightening of the inlet socket of the valve housing in the outlet socket of the liquid container, caused by screwing the union nut that is captively secured on the inlet socket of the valve housing onto the outlet socket of the liquid container, interlock with the locking cams of an inner annular cam arrangement formed on the outer end of the outlet socket of the container.

In accordance with the present invention, this is achieved also in that the anti-twist device is provided with an adapter ring that has, distributed about its circumference, inner and outer locking cams, wherein the adapter ring that can be slipped onto the insertion end of the inlet socket of the valve housing engages with the inner locking cams matching longitudinal grooves in the outer wall of the inlet socket of the valve housing and the adapter ring, upon tightening of the inlet socket of the valve housing in the outlet socket of the liquid container, caused by screwing the union nut that is captively secured on the inlet socket of the valve housing onto the outlet socket of the liquid container, engages with the outer locking cams matching longitudinal grooves provided in the inner wall of the outlet socket of the container.

BRIEF DESCRIPTION OF THE DRAWING

In the drawing:

FIG. 2 is an end view of the butterfly valve of FIG. 1;

FIG. 3 shows the inlet socket of a valve housing of the butterfly valve according to FIGS. 1 and 2 in a perspective illustration;

DESCRIPTION OF THE PREFERRED EMBODIMENTS

Figure 1:
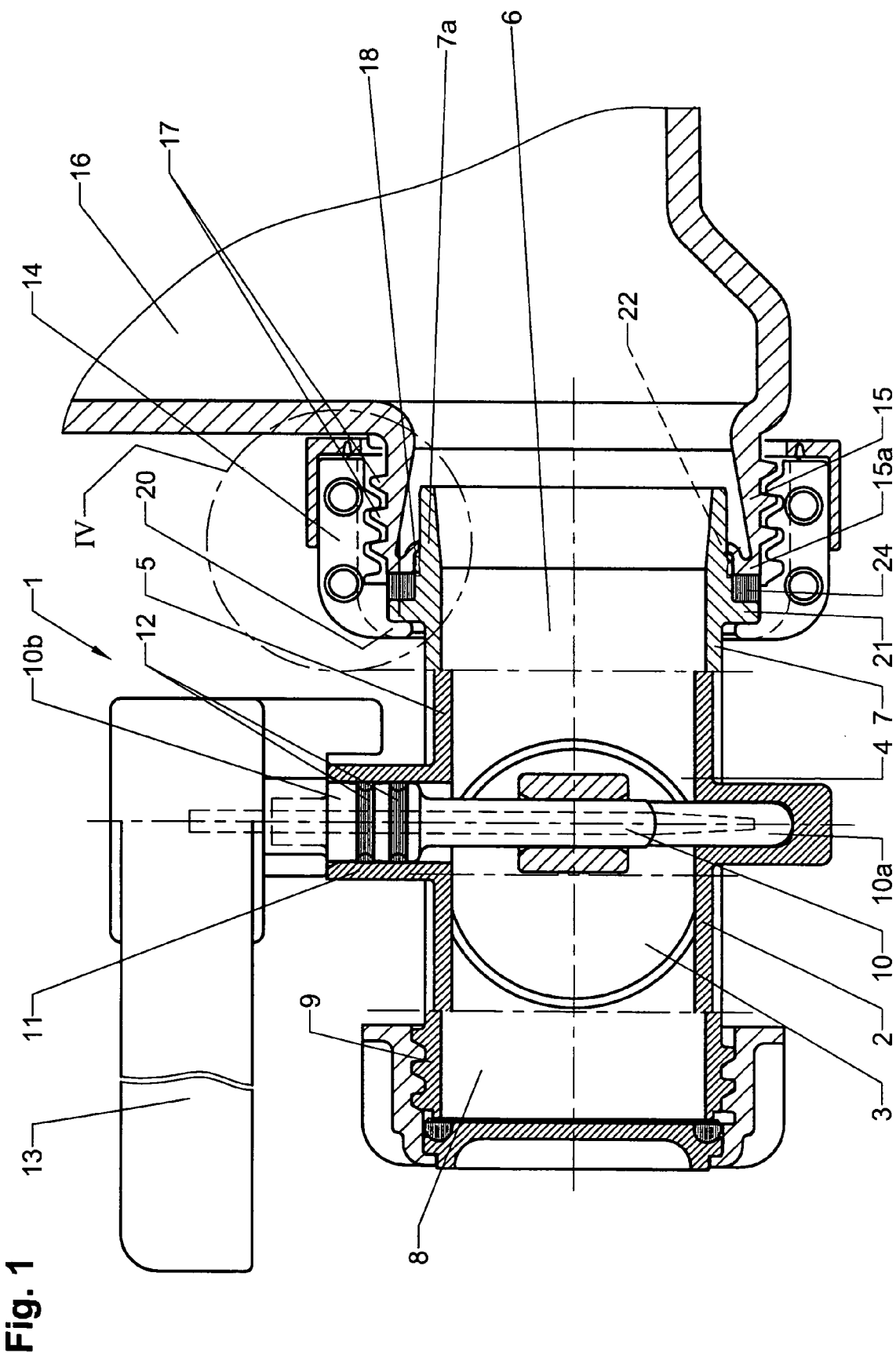
FIG. 1 shows a longitudinal section view of a butterfly valve with a first embodiment of an anti-twist device.
Figure 4:
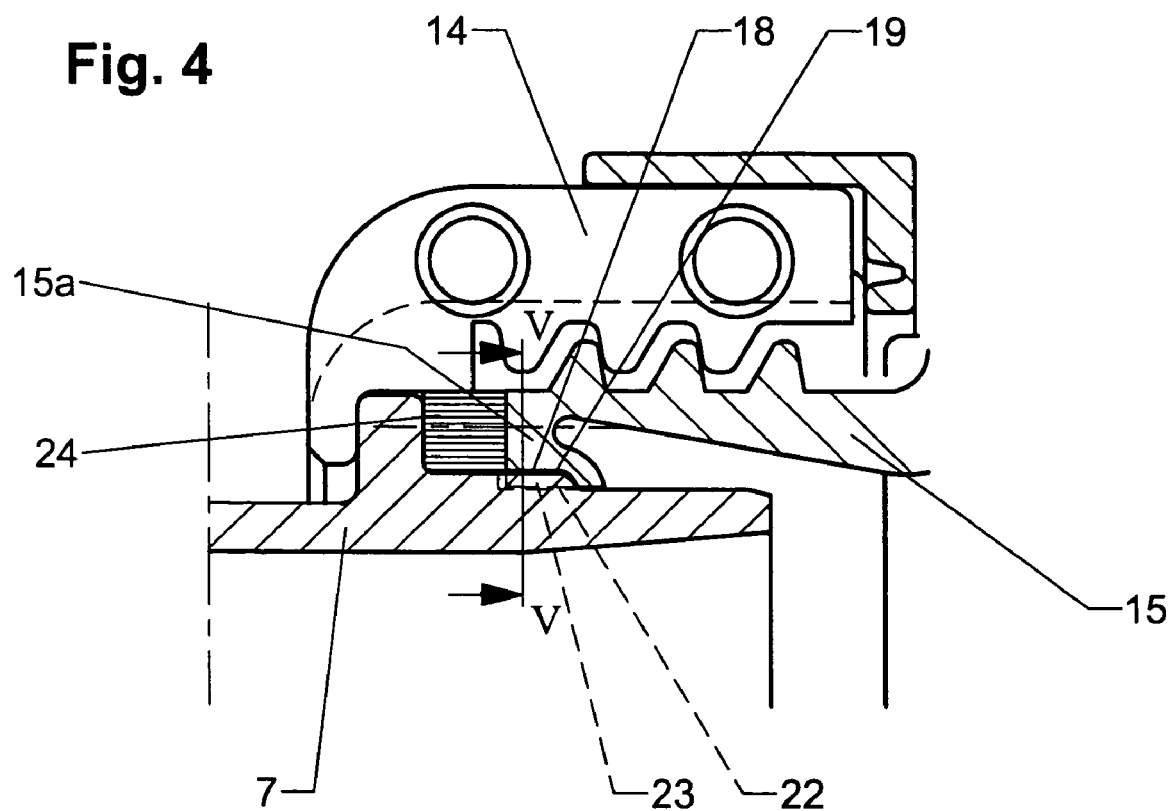
FIG. 4 shows a detailed view of the detail IV of FIG. 1.
Figure 5:
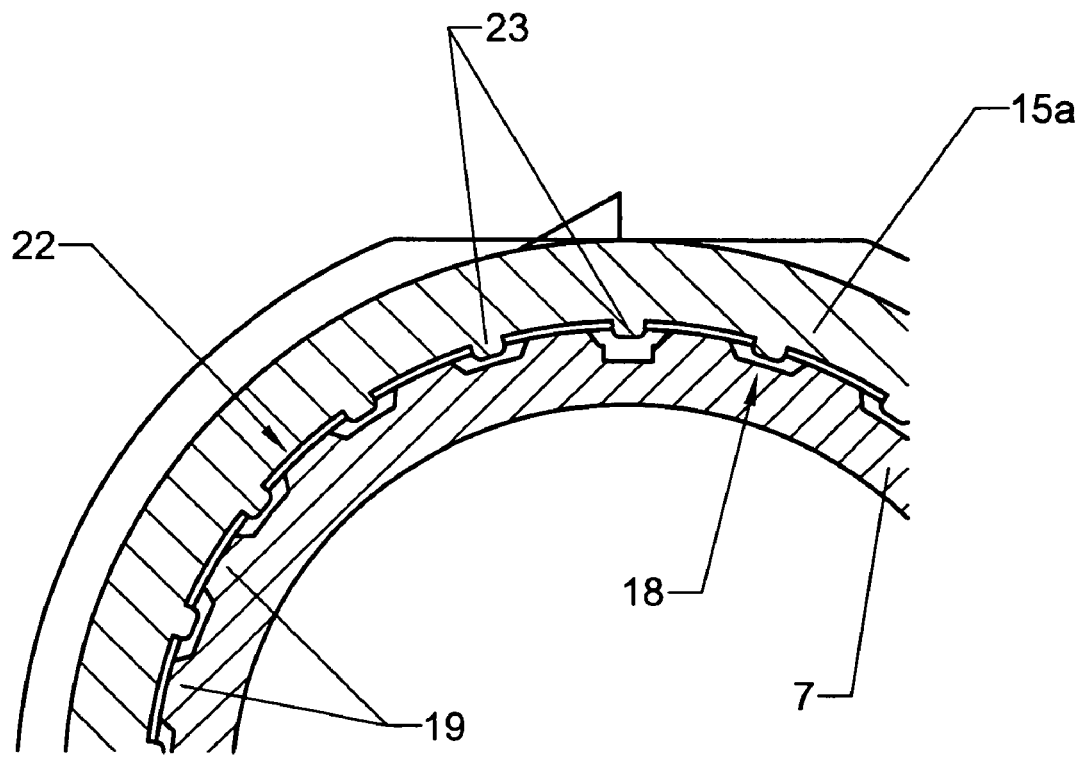
FIG. 5 is a cross-section of the anti-twist device according to section line V-V of FIG. 4.

The butterfly valve 1 according to FIGS. 1 and 2 is comprised of high-density polyethylene (HDPE) and has a valve housing 2 that receives a valve flap 3 for opening and closing the central through opening 4 of the housing chamber 5 that communicates with the inlet channel 6 of an inlet socket 7 fused to the valve housing 2 and with the outlet channel 8 of the outlet socket 9 of the valve housing 2. The valve flap 3 is fastened eccentrically on a rotary shaft 10 whose end 10a is supported rotatably in the valve housing 2 and whose other end 10b projects outwardly past a bearing socket 11 from the valve housing 2. The rotary shaft 10 is sealed relative to the exterior by means of sealing rings 12 in the bearing socket 11. On the end 10b of the rotary shaft 10 of the valve flap 3 projecting from the valve housing 2, a handle 13 is provided for opening and closing the butterfly valve 1.

The butterfly valve 1 is secured by means of a union nut 14 on the outlet socket 15 of a liquid container 16, for example, an inner plastic container of a pallet container. The liquid container 16 and the outlet socket 9 having an outer thread 17 are manufactured together by blow-molding as a monolithic part.

The butterfly valve 1 has an anti-twist device comprising an outer annular cam arrangement 18 arranged on the inlet socket 7 of the valve housing 2. When pushing the inlet socket 7 of the valve housing 2 into the outlet socket 15 of the liquid container 16 by tightening the union nut 14, that is secured captively on the inlet socket 17 of the valve housing 2 and engages by means of an annular shoulder 20 a collar 21 of the inlet socket 7, on the outlet socket 15 of the liquid container 16, the locking cams 19 of the cam arrangement 18 interlock with the locking cams 23 of the inner annular cam arrangement 22 formed on the outer end 15a of the outlet socket 15 of the container 16.

The butterfly valve 1 is sealed relative to the container by means of a sealing ring 24 seated on the inlet socket 7 of the valve housing 2, wherein the sealing ring 24, when screwing the union nut 14 onto the outlet socket 15 of the liquid container 16, is clamped between the collar 21 of the inlet socket 7 of the valve housing 2 and the outer end 15a of the outlet socket 15 of the liquid container 16.

Figure 6:
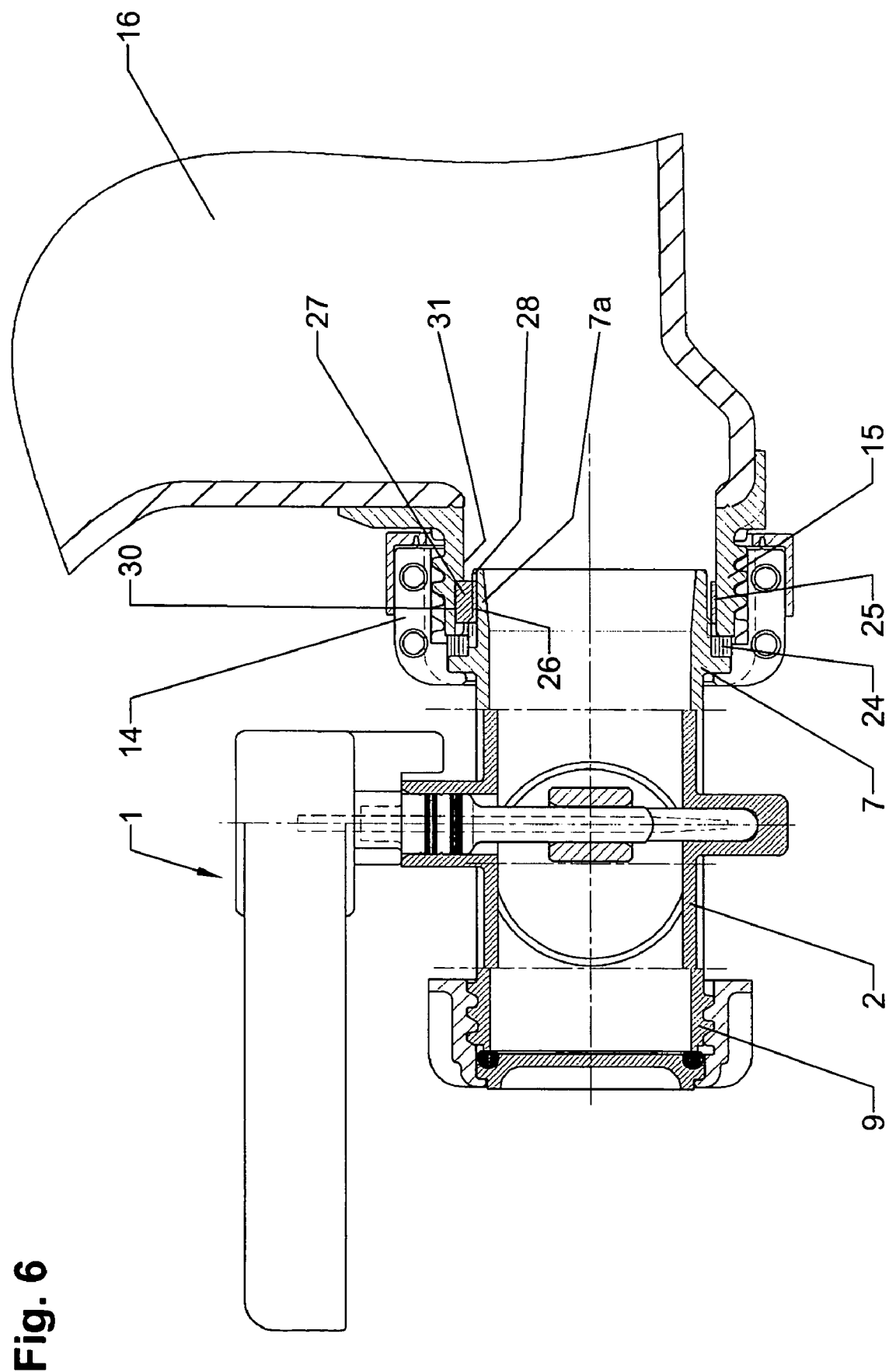
FIG. 6 is a longitudinal section view of a butterfly valve with another embodiment of the anti-twist device.

FIGS. 6 and 3 show a butterfly valve 1 with a different embodiment of an anti-twist device. This anti-twist device has an adapter ring 25 that has inner and outer locking cams 26, 27 distributed about its circumference, wherein the inner locking cams 26 of the adapter ring 25, when the adapter ring 25 is pushed onto the insertion end 7a of the inlet socket 7 of the valve housing 2, engage matching longitudinal grooves 28 in the outer wall 29 of the inlet socket 7 of the valve housing 2. When tightening the inlet socket 7 of the valve housing 2 in the outlet socket 15 of the liquid container 16 by screwing the union nut 14, captively secured on the inlet socket 7 of the valve housing 2, onto the outlet socket 15 of the liquid container 16, the adapter ring 25 engages with the outer locking cams 27 matching longitudinal grooves 30 in the inner wall 31 of the outlet socket 15 of the container 16.

In the disclosed second embodiment of the anti-twist device of the butterfly valve 1, the outlet socket 15 with outer thread 17, manufactured of plastic material as an injection-molded plastic part, is blow-molded onto the liquid container 16.

The inlet socket 7 illustrated in FIG. 3 that is welded or fused onto the valve housing 2 of the butterfly valve 1 is manufactured as an injection-molded plastic part together with the annular cam arrangement 18 and the longitudinal grooves 28 so that the butterfly valve 1 can be provided, as needed, with one or the other afore-described anti-twist configuration.

While specific embodiments of the invention have been shown and described in detail to illustrate the inventive principles, it will be understood that the invention may be embodied otherwise without departing from such principles.

What is claimed is:

1. A plastic outlet valve for plastic transport and storage containers for liquids, the outlet valve comprising:

a valve housing having an inlet socket and a union nut captively secured on the inlet socket, wherein the inlet socket is configured to be screwed with the union nut onto an outlet socket, provided with an outer thread, of a liquid container;

the valve housing further having an outlet socket;

an anti-twist device comprising an outer annular cam arrangement that is arranged on the inlet socket of the valve housing;

wherein the outer annular cam arrangement has locking cams;

wherein the locking cams, when tightening the inlet socket of the valve housing in the outlet socket of the liquid container by screwing the union nut onto the outlet socket of the liquid container, are configured to interlock with the locking cams of an inner annular cam arrangement formed on the outer end of the outlet socket of the container.

2. The outlet valve according to claim 1 wherein the outlet valve is a butterfly valve or a ball valve.

3. The outlet valve according to claim 1, wherein the inlet socket of the valve housing and the outer annular cam arrangement are a monolithic injection-molded part and the injection-molded part is fused to the valve housing.

4. The outlet valve according to claim 1, wherein the liquid container and the outlet socket of the liquid container are a unitary blow-molded part.

* * * * *